(12) United States Patent
Suzuki et al.

(10) Patent No.: US 6,507,873 B1
(45) Date of Patent: Jan. 14, 2003

(54) NETWORK ADDRESS ASSIGNING SYSTEM

(75) Inventors: Yuichi Suzuki, Tokyo (JP); Takafumi Sera, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/349,017

(22) Filed: Jul. 7, 1999

(30) Foreign Application Priority Data

Jul. 8, 1998 (JP) .............................................. 10-193216

(51) Int. Cl.[7] .............................................. G06F 15/16
(52) U.S. Cl. ........................................ 709/245; 709/203
(58) Field of Search ............................... 709/245, 203, 709/238, 223; 370/409, 351

(56) References Cited

U.S. PATENT DOCUMENTS 6,311,208 B1 * 10/2001 Miyamoto et al. .......... 370/403

FOREIGN PATENT DOCUMENTS

| JP | 61-123232 | 6/1986 |
|----|-----------|--------|
| JP | 61-251343 | 11/1986 |
| JP | 01-101750 | 4/1989 |
| JP | 6-177887 | 6/1994 |
| JP | 7-38600 | 2/1995 |
| JP | 8-331150 | 12/1996 |
| JP | 09-270803 | 10/1997 |

* cited by examiner

*Primary Examiner*—Mehmet B. Geckil
(74) *Attorney, Agent, or Firm*—Sughrue Mion, PLLC

(57) ABSTRACT

A network address assigning system includes sub-networks connected to each other, a network composed of the sub-networks connected to each other, an address server for managing network addresses of the sub-net-works, nodes for transmitting and receiving messages over the sub-networks, routing nodes for transmitting and receiving messages, for transferring messages over the sub-networks, and for managing addresses of the sub-networks, a change indicator for causing the address server to re-assign network addresses of the sub-networks and for causing the routing nodes to notify the address server of the network addresses of the routing nodes, storage for causing the address server to store address information, and a notifier for causing the address server to communicate with the routing nodes and to notify the routing nodes of network address information that has been newly registered/changed.

9 Claims, 13 Drawing Sheets

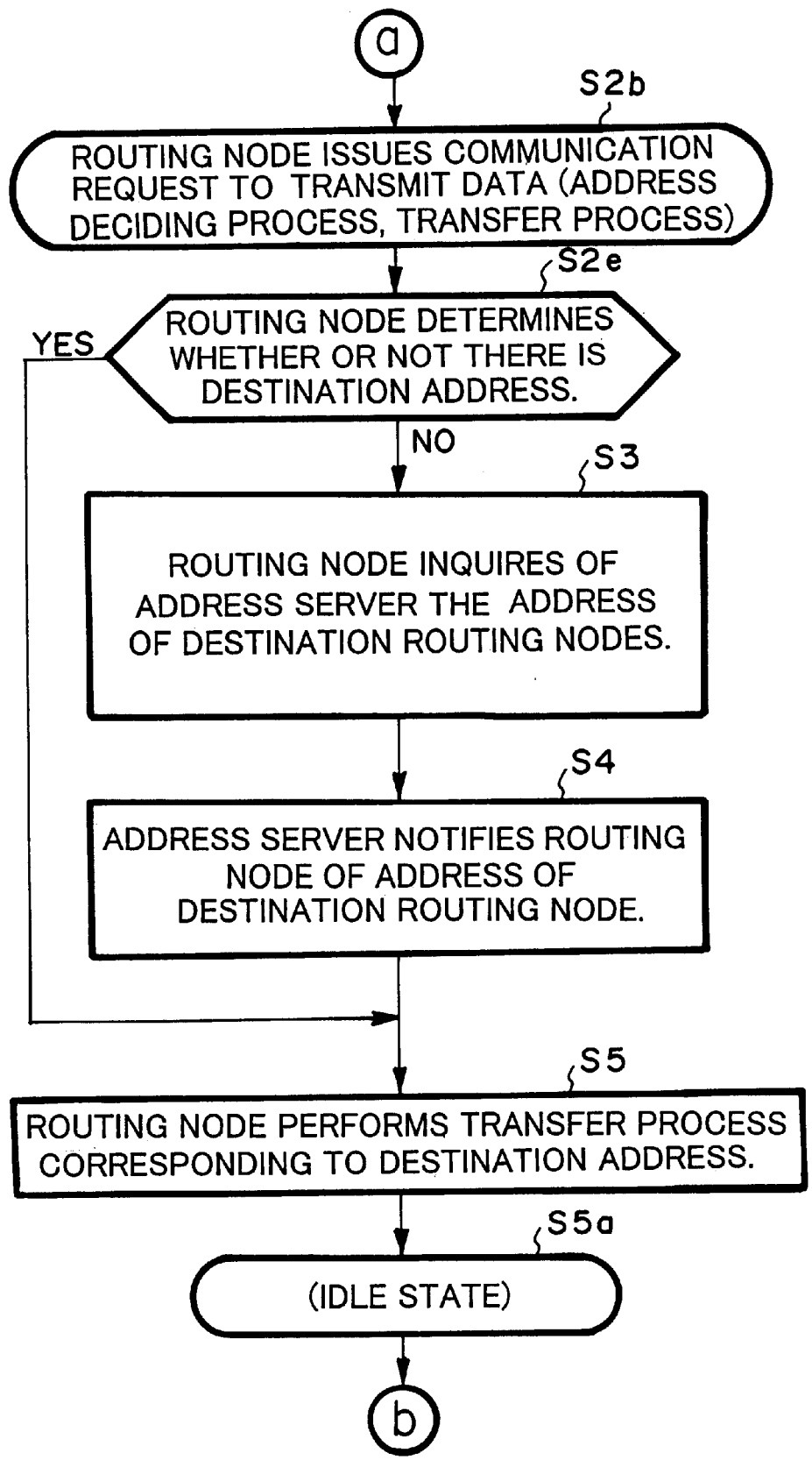

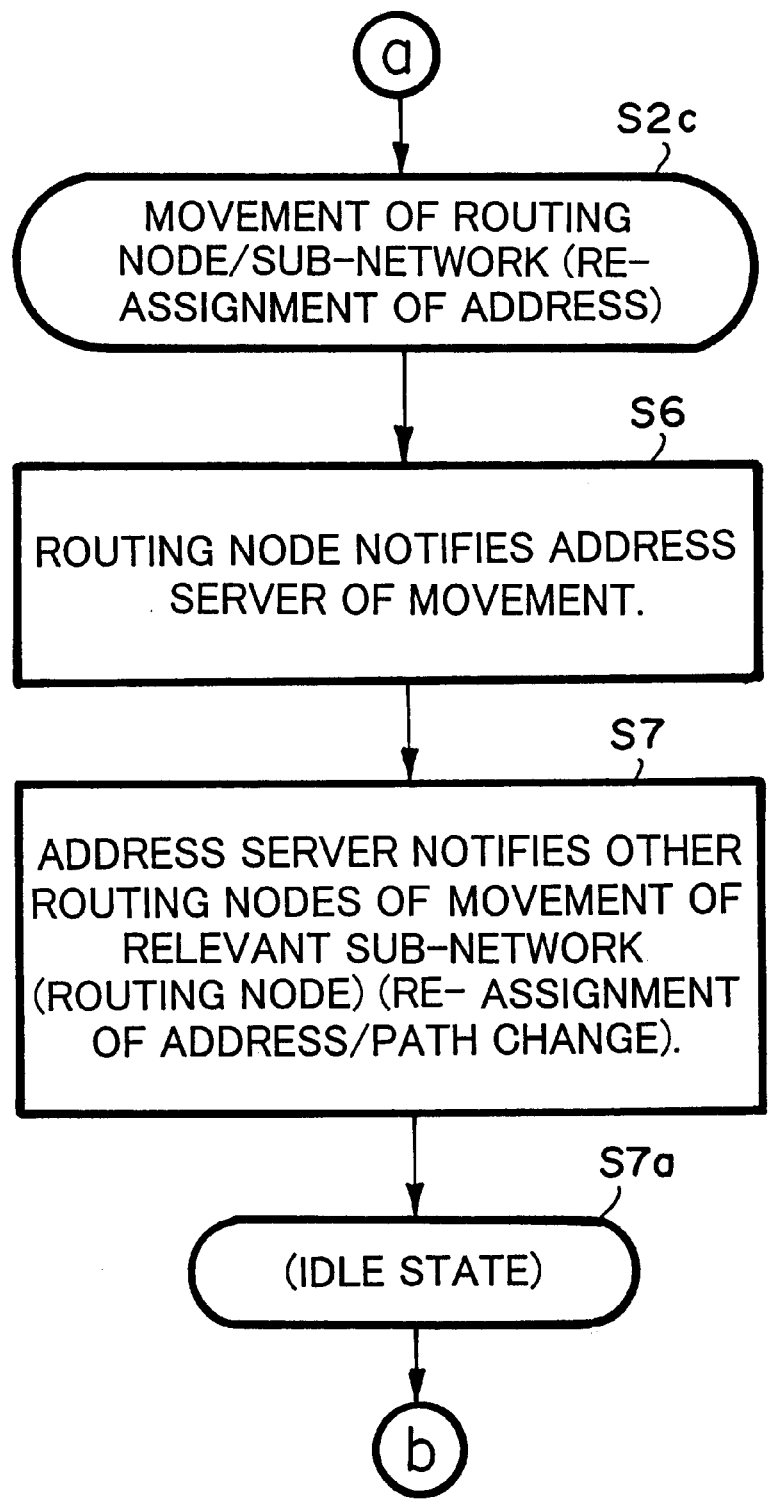

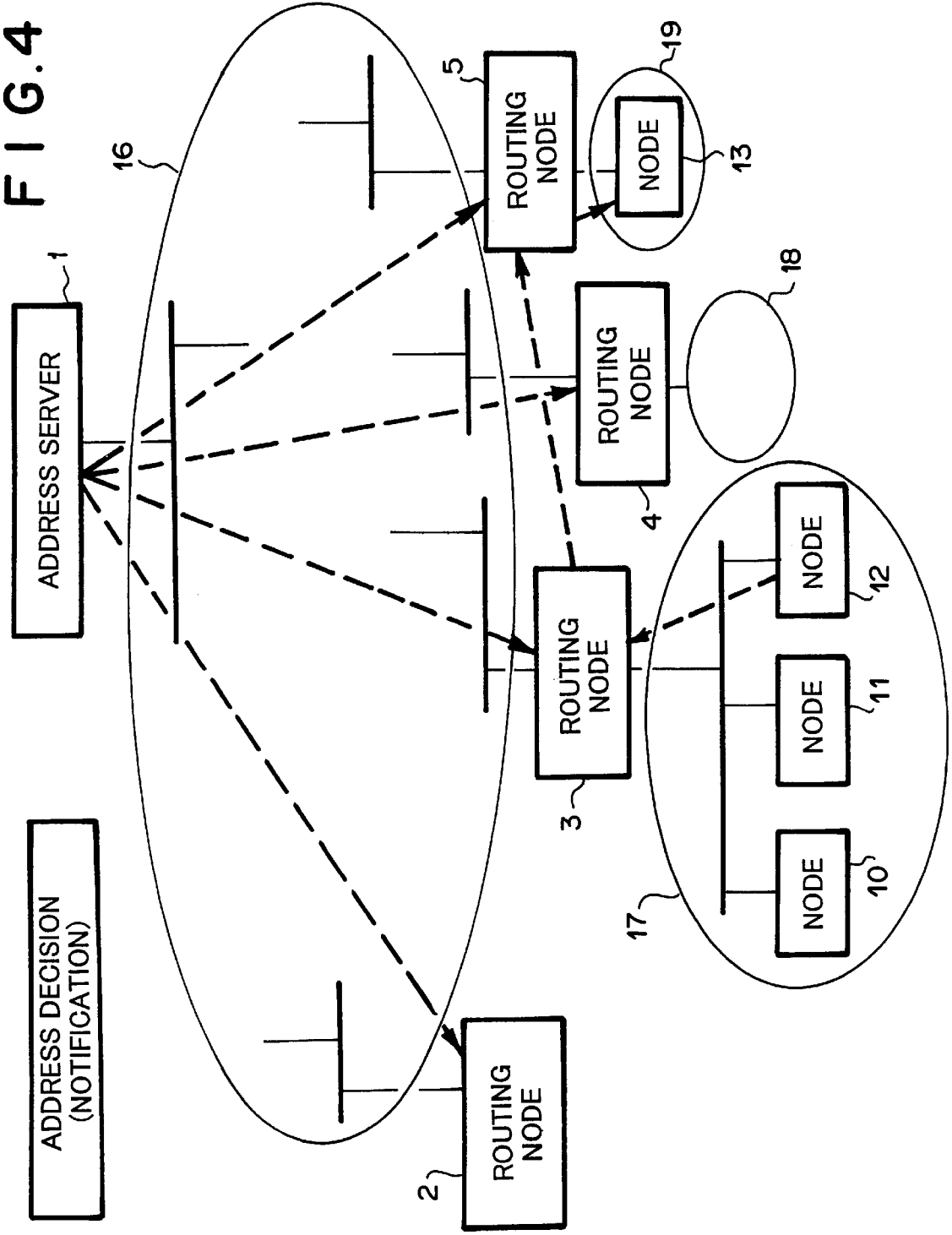

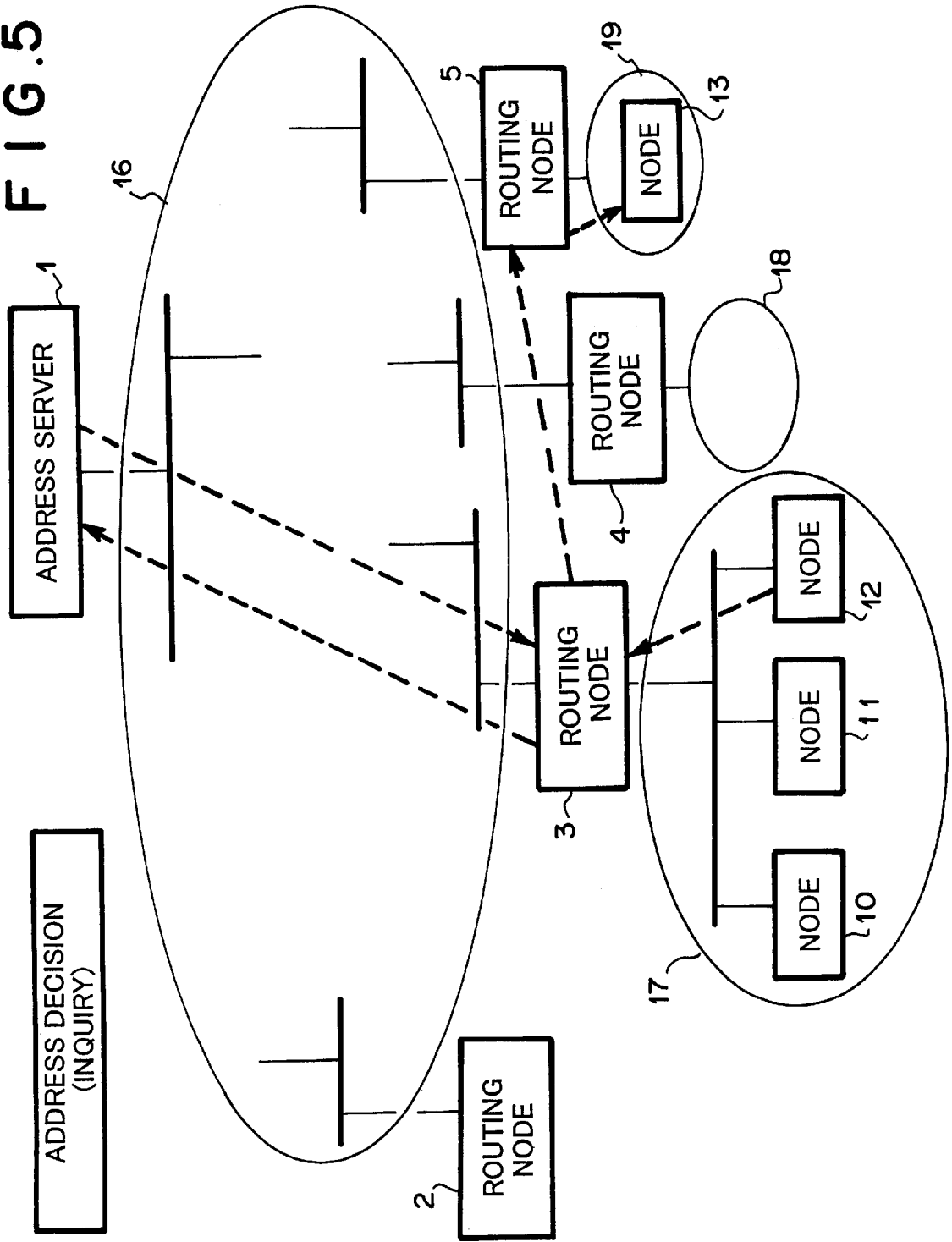

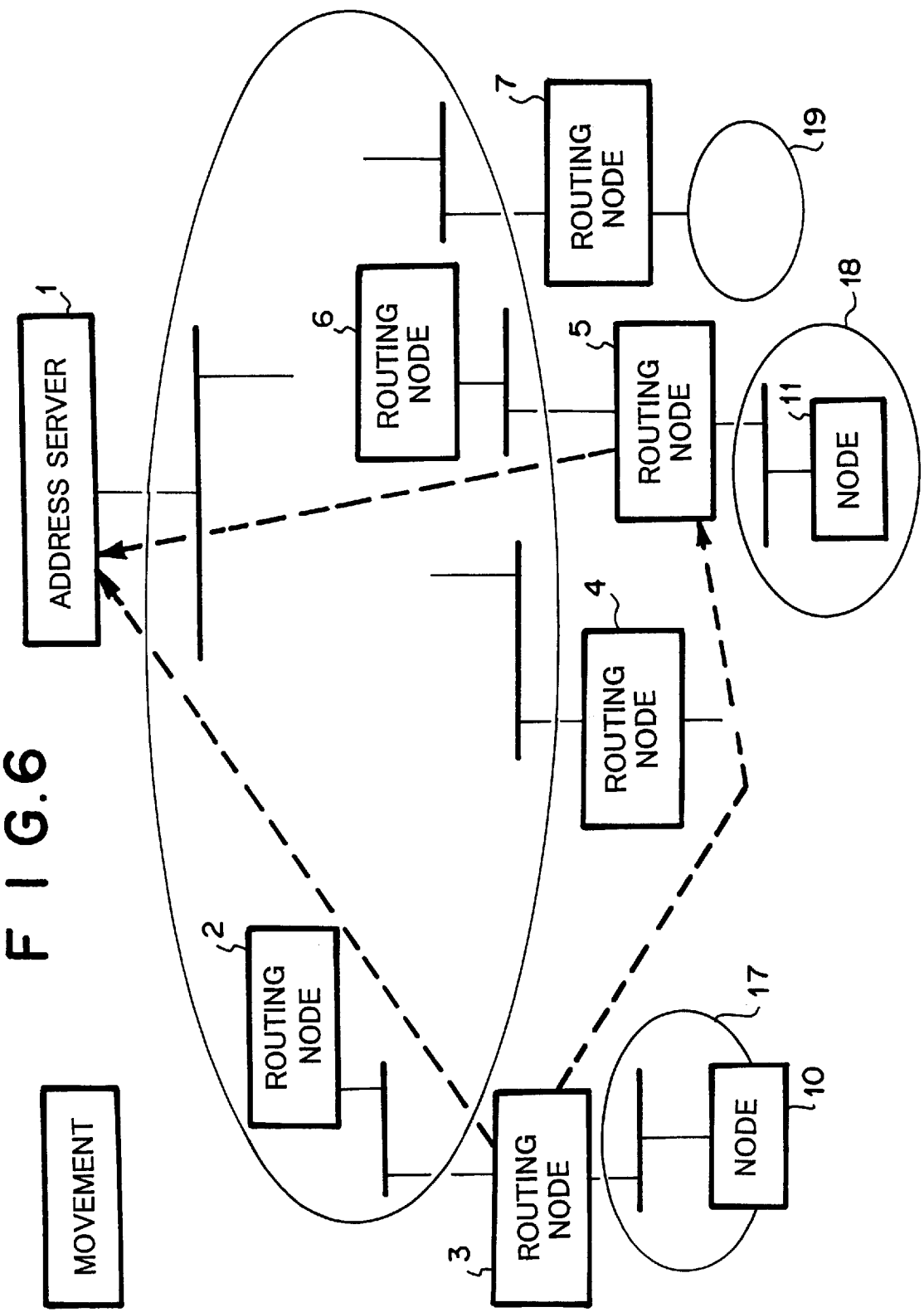

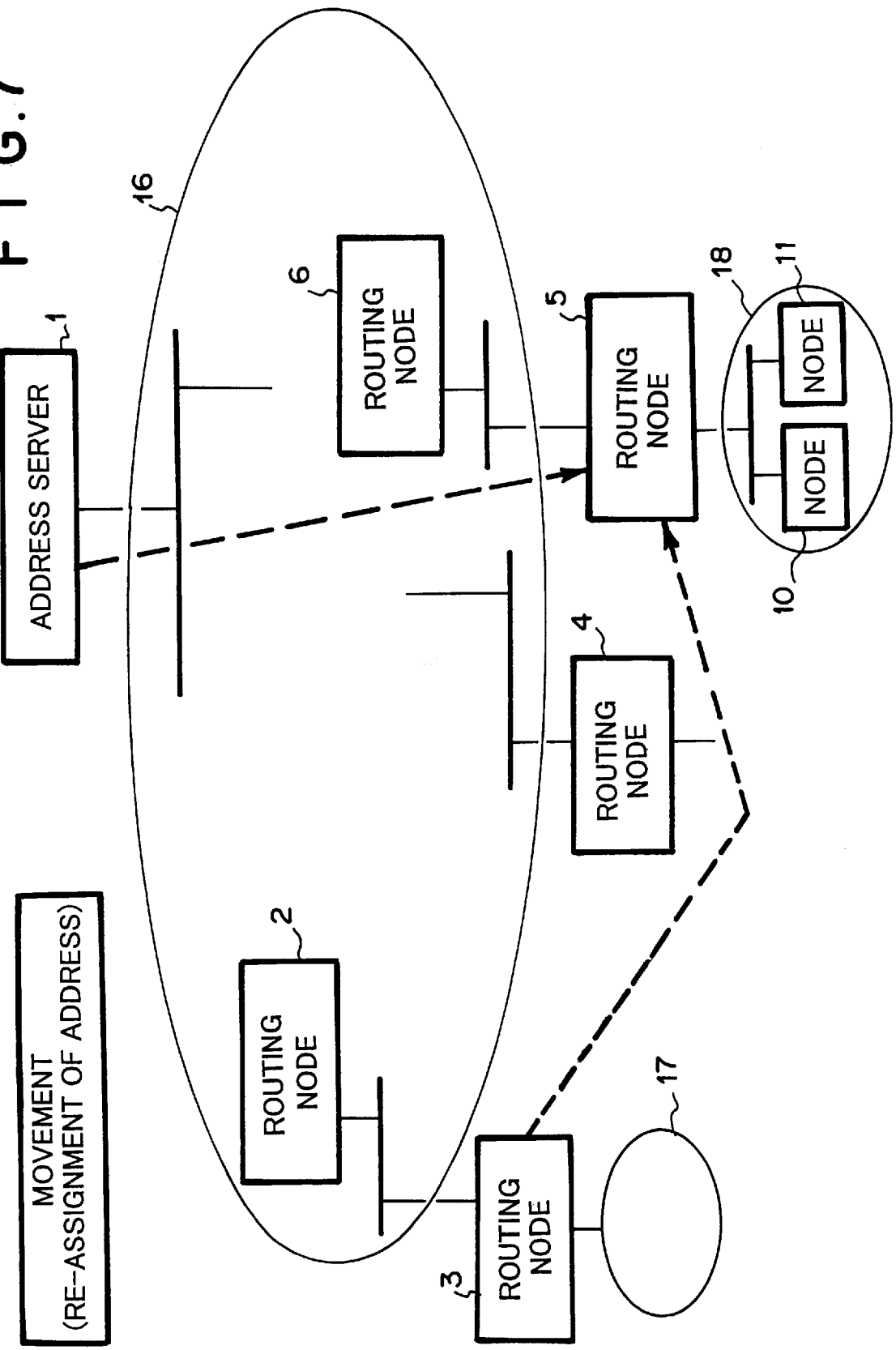

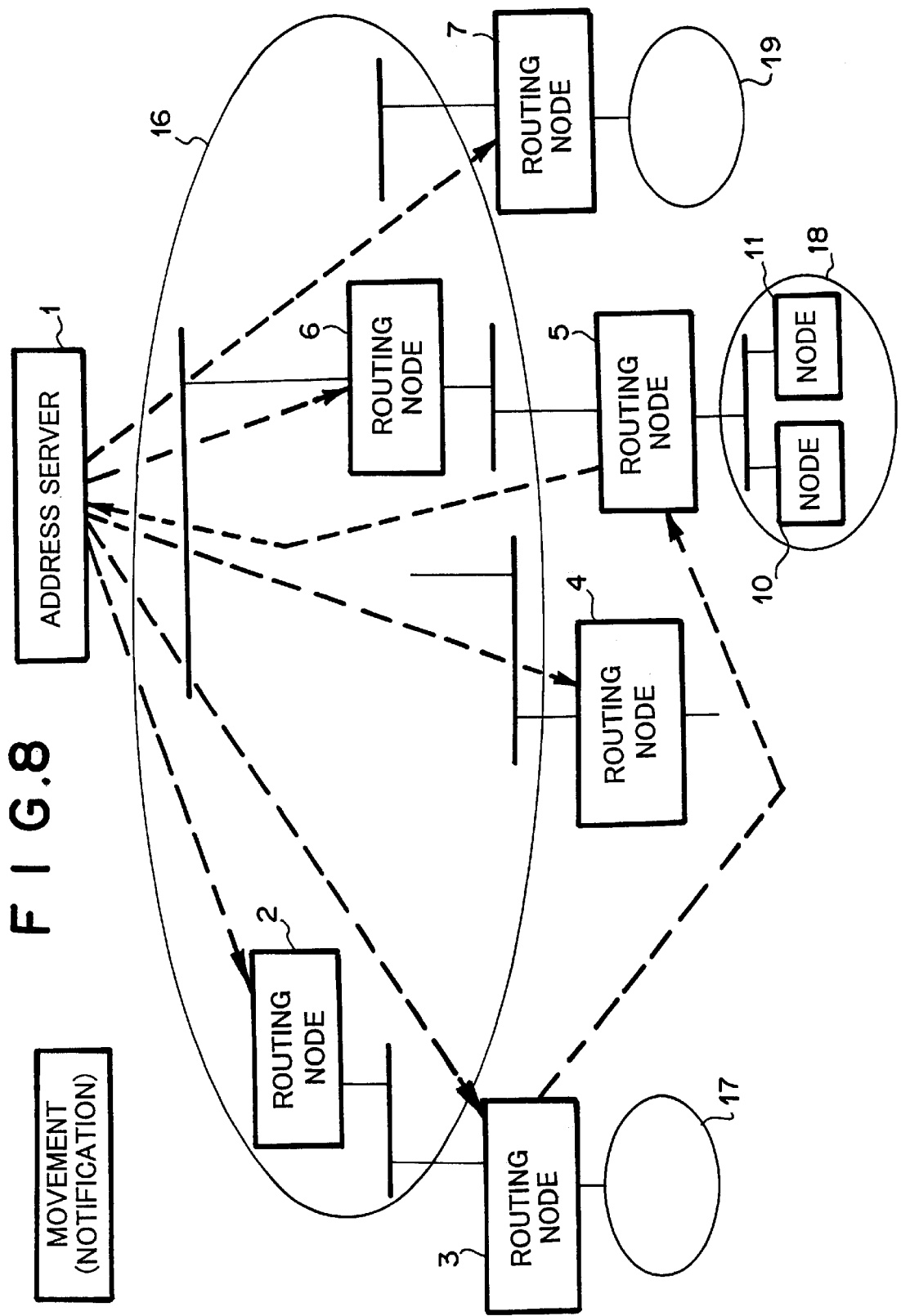

NETWORK ADDRESS ASSIGNING SYSTEM

BACKGROUND OF THE INVENTION

1. Field of the Invention

The present invention relates to a network address assigning system, in particular, to a network address assigning system for managing addresses of a network and sub-networks such as LAN (Local Area Network), WAN (Wide Area Network), Intra-Net, and Extra-Net.

2. Description of the Related Art

Whenever a node is newly added or moved, terminal addresses/IP addresses of a conventional computer network are individually aligned/changed.

In Japanese Patent Laid-Open Publication No. 9-130421 as a first related art reference of the present invention, a terminal address management system corresponding to a virtual network management method is disclosed. In the terminal address management system, a management table for managing a MAC (Media Area Control) address, VLAN (Virtual Local Address Network) identifier, a switching hub identifier, and a port number is used. The MAC address is used for identifying a LAN board of a computer. In the first related art reference, network addresses are intensively managed by an address server.

In Japanese Patent Laid-Open Publication No. 8-194657 as a second related art reference of the present invention, an IP address automatic assigning system for portable terminals connected to a local area network is disclosed. The system is used for an automatic Internet program apparatus. In the second related art reference, network addresses are intensively managed by an address server.

In Japanese Patent Laid-Open Publication No. 6-062020 as a third related art reference of the present invention, a computer network structuring/modifying system is disclosed. In the system, addresses are changed and reused corresponding to the movement of a node. In the third related art reference, network addresses are intensively managed by an address server.

In Japanese Patent Laid-Open Publication No. 8-204719 as a fourth related art reference of the present invention, an IP address assigning apparatus and an IP address assigning method are disclosed. In the fourth related art reference, terminal addresses are managed by a terminal IP address management server.

In Japanese Patent Laid-Open Publication No. 2-222336 as a fifth related art reference of the present invention, a computer address management system is disclosed. In the fifth related art reference, a terminal inquires a local address of an address server.

In Japanese Patent Laid-Open Publication No. 5-028065 as a sixth related art reference of the present invention, an information processing system is disclosed. In the sixth related art reference, an address management server automatically assigns an address of a client corresponding to an address assignment request issued therefrom.

In Japanese Patent Laid-Open Publication No. 61-123232 as a seventh related art reference of the present invention, an address assigning system for a local area network system is disclosed. The structure of the address assigning system is shown in FIG. 1. Referring to FIG. 1, an address server 1 manages addresses of nodes 10, 11, 12, and 13 of sub-networks 17, 18, and 19 of routing nodes 2, 3, 4, and 5 as well as addresses of routing nodes 2, 3, 4, and 5 of a main-network 16. Thus, for example, whenever a node is added or deleted, the contents of a destination address table for all nodes should be updated. Thus, to flexibly operate the system, the routing nodes 2 to 5 have respective address server functions so as to distributively manage addresses.

In the first related art reference, the address server does not totally manage the full network as a set of routing nodes and sub-networks thereof. In other words, network addresses of the sub-networks cannot be assigned and managed. Thus, the system of the first related art reference cannot handle the movement of a sub-network. In addition, since the address server does not communicate with the routing nodes, network addresses cannot be totally assigned over the network.

In the second related art reference, the address server does not totally manage the network as a set of routing nodes and sub-networks. In addition, addresses of the sub-networks are not assigned and managed. Consequently, the system of the second related art reference cannot handle the movement of a sub-network. In addition, since the address server does not communicate with the routing nodes, network addresses cannot be totally assigned over the network.

In the third related art reference, address servers are disposed corresponding to individual domains. Since terminal addresses are managed in association with node names, the address management servers do not assign and manage addresses of sub-networks.

In the fourth related art reference, network addresses are not managed. In the fifth related art reference, although the address server manages terminal addresses, it does not manage network addresses.

In the sixth related art reference, although the address server manages client addresses, it does not manage network addresses.

In the seventh related art reference, addresses are hierarchically managed corresponding to an expansion or a deletion of a node in a sub-network. However, in the seventh related art reference, the movement of a sub-network and the movement of both a sub-network and a routing node at a time are not mentioned at all.

SUMMARY OF THE INVENTION

An object of the present invention is to provide a system that handles the movement of both a routing node and a sub-network thereof at a time and that manages addresses in a multi-home format.

The present invention is a network address assigning system, comprising a plurality of sub-networks directly communicated with each other, a network composed of the sub-networks connected to each other, an address server for managing network addresses of the sub-networks, a plurality of nodes for transmitting and receiving messages over the sub-networks, a plurality of routing nodes each having a node function for transmitting and receiving a message, a router function for transferring a message over the sub-networks, and an address management function for managing addresses of the sub-networks, a change indicator for causing the address server to re-assign network addresses of the sub-networks and for causing the routing nodes to notify the address server of network addresses of the routing nodes, storage for causing the address server to store address information, and a notifier for causing the address server to communicate with the routing nodes and to notify the routing nodes of network address information that has been newly registered/changed.

When the network address information is registered by the change notifier, the address server does not notify the routing nodes of the network address information that has been newly registered/changed.

The routing nodes each have a means for inquiring data of the address server, and a means for obtaining the latest address information of the network.

IP (Internet Protocol) datagram (a kind of packet) is transferred corresponding to a network address assignment table physically stored by the address server and the sub-networks of the routing nodes.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 3A, 3B, 3C, and 3D are flow charts for explaining the operation of the system according to an embodiment of the present invention;

FIG. 4 is a schematic diagram showing the structure of a network according to an embodiment of the present invention;

FIG. 5 is a schematic diagram showing the structure of the network according to an embodiment of the present invention;

FIG. 6 is a schematic diagram showing the structure of the network according to an embodiment of the present invention;

FIG. 7 is a schematic diagram showing the structure of the network according to an embodiment of the present invention;

FIG. 8 is a schematic diagram showing the structure of the network according to an embodiment of the present invention;

DESCRIPTION OF PREFERRED EMBODIMENTS

Next, with reference to the accompanying drawings, embodiments of the present invention will be described.

[First Embodiment]

(Structure of First Embodiment)

Figure 1:
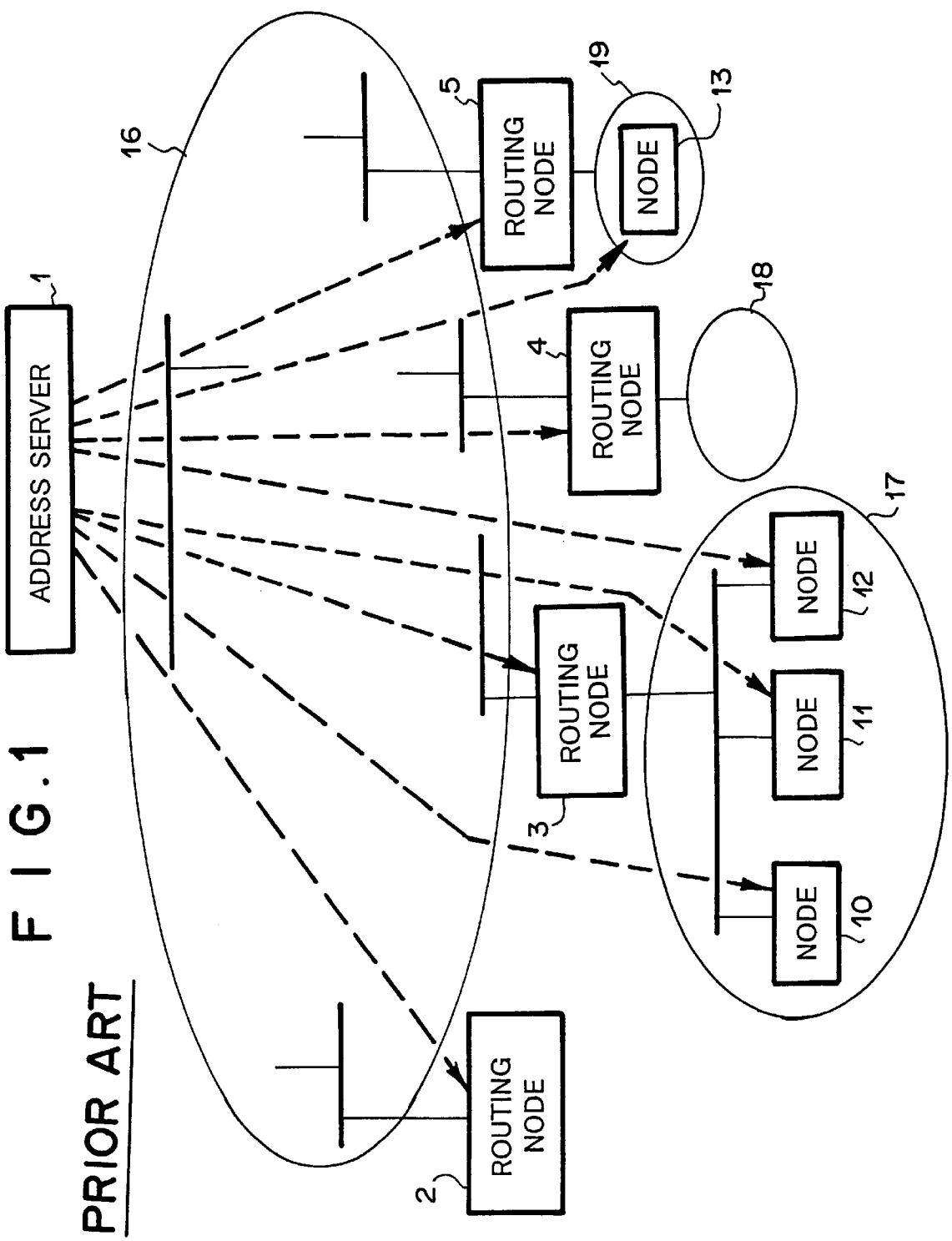
FIG. 1 is a schematic diagram showing the structure of a conventional system.
Figure 2:
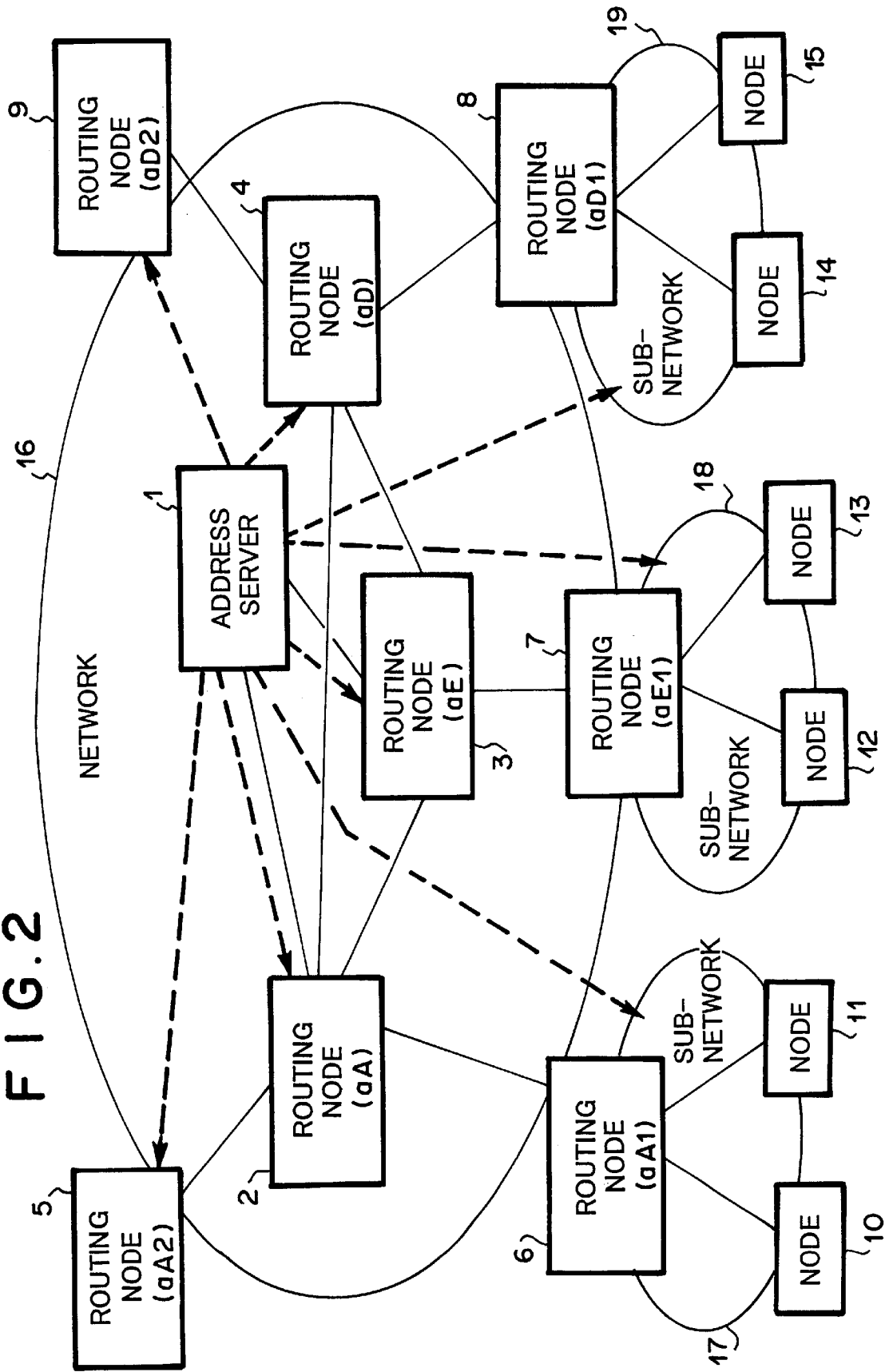
FIG. 2 is a schematic diagram showing the structure of a system according to an embodiment of the present invention.
Figure 3A:
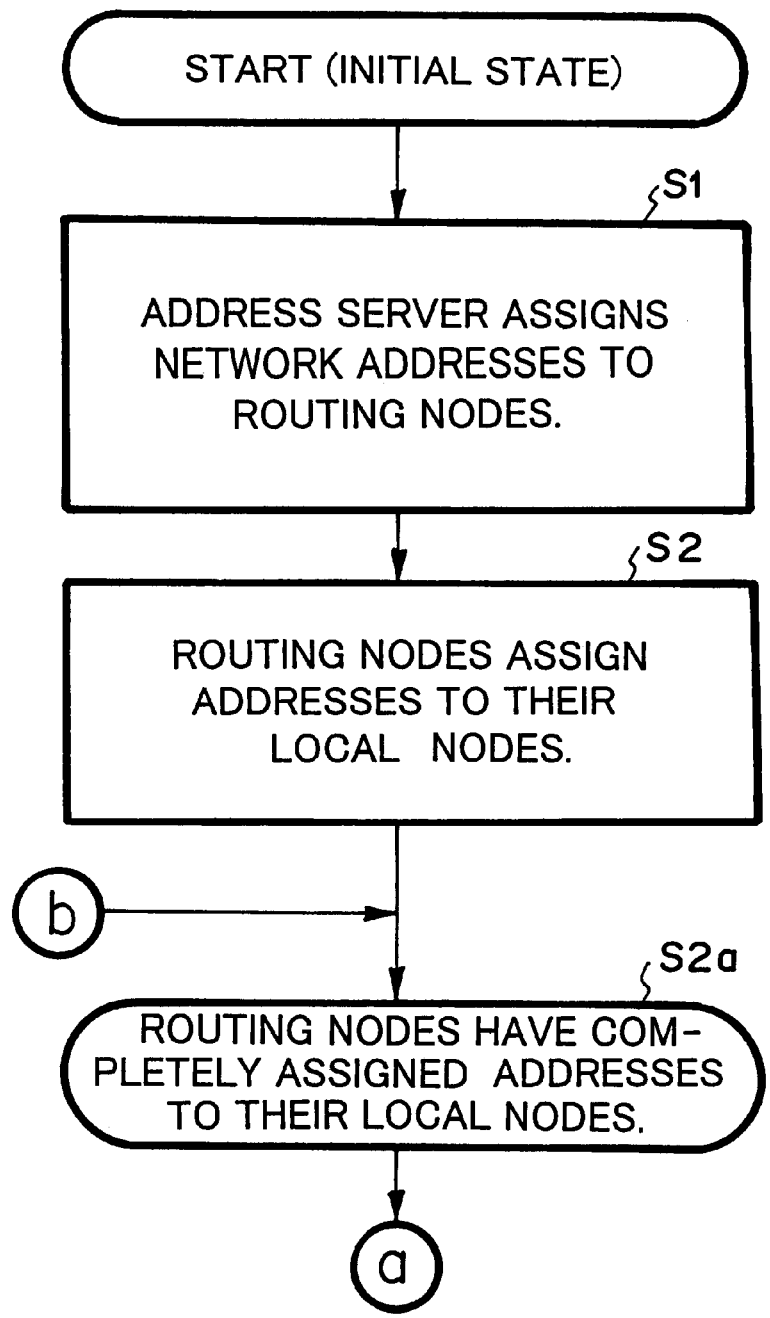
Figure 3D:
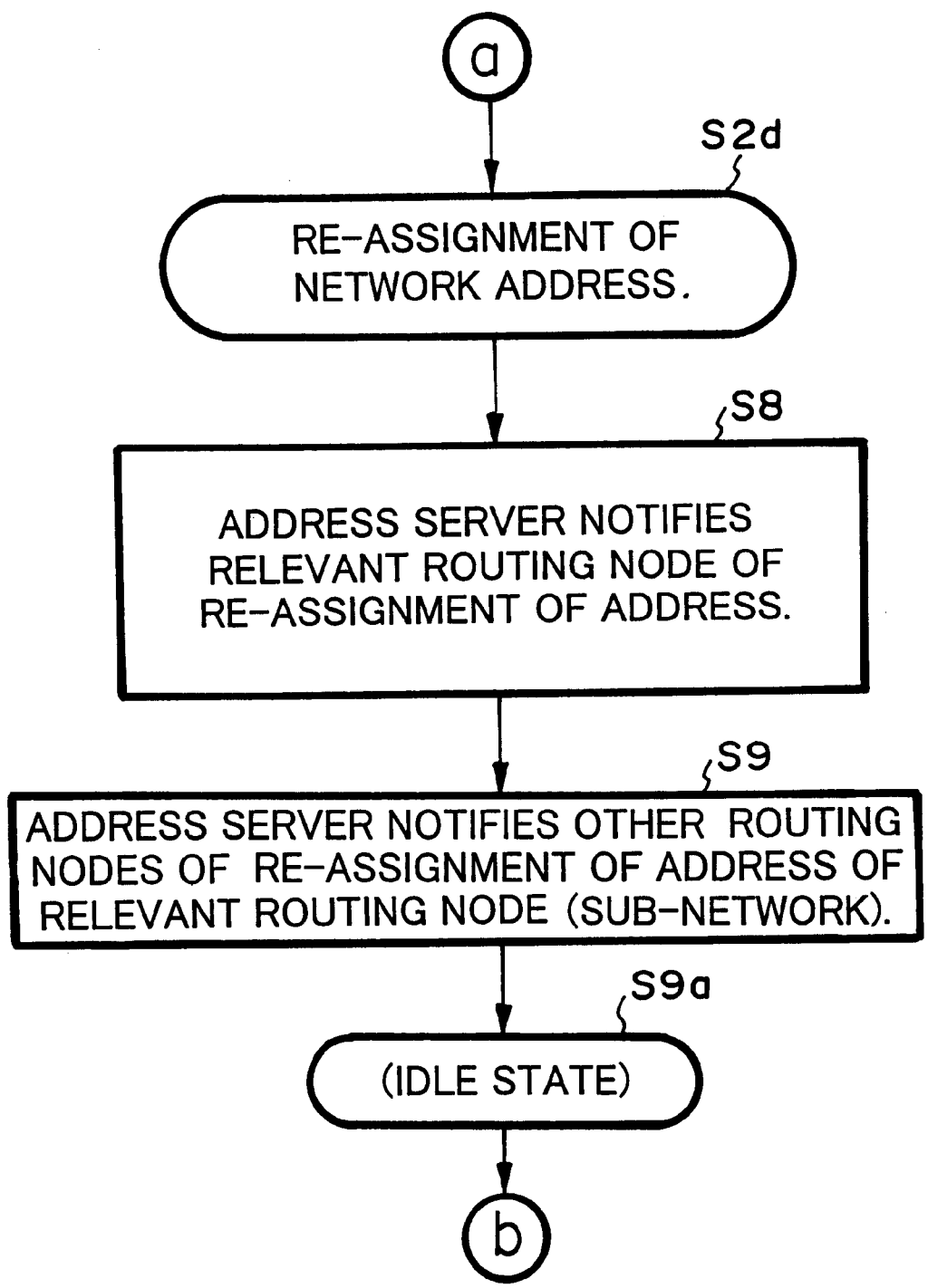

FIG. 2 shows the structure of a network address assigning system according to the first embodiment of the present invention.

In the first embodiment, a program address server 1 is disposed in a main network 16. The program address server 1 manages network addresses assigned to routing nodes 2, 3, 4, 5, 6, 7, and 9 and addresses assigned to sub-networks 17, 18, and 19. The sub-networks 17 to 19 are connected to the routing nodes 2 to 9. The sub-network 17 has nodes 10 and 11. The sub-network 18 has nodes 12 and 13. The sub-network 19 has nodes 14 and 15. The nodes 10 to 15 transmit and receive datagram (that is a short message composed of one packet) corresponding to IP (Internet Protocol). The nodes 10 and 11 connected to the routing node 6. The nodes 12 and 13 are connect to the routing node 7. The nodes 14 and 15 are connected to the routing node 8. Each of the routing nodes 2 to 9 transfers datagram corresponding to a destination address of the network as shown in FIG. 2.

Each of the routing nodes 2 to 9 decides the address of a received datagram and transfers the datagram to a routing node that manages a destination sub-network (hereinafter, such a process is referred to as address deciding process).

The address deciding process is performed in two methods that follow. In the first method, an address is decided with address information of another routing node received from the address server 1 (see FIG. 4). In the second method, an address is decided with an inquiry to the address server 1 (see FIG. 5).

FIG. 4 shows the first method of the address deciding process. Referring to FIG. 4, an address server 1 notifies routing nodes 2 to 5 connected to a main network 16 of addresses of the routing nodes 2 to 5. When a network address of a routing node is changed, the address server 1 notifies other routing nodes of relevant address change information.

FIG. 5 shows the second method of the address deciding process. Referring to FIG. 5, a routing node 2 to 5 of a main network 16 inquires of an address server 1 a destination address. The address server 1 notifies the routing node of the destination address. In addition, the address server 1 replies of a particular routing node data for the address deciding process.

FIG. 6 shows the movement of a routing node. Referring to FIG. 6, when a routing node 3 is moved from the position under a routing node 2 to the position under a node 4, at the position under the routing node 2, the routing node 3 notifies an address server 1 of the movement. After the routing node 3 has been moved to the position under the routing node 6, the routing node 3 notifies the address server 1 of the movement. Thus, the address server 1 can always manage addresses of a routing node that moves.

FIG. 7 shows an address re-assignment in the case of the movement of a routing node. Referring to FIG. 7, when a routing node 3 that has a sub-network 17 is moved from the positon under a routing node 2 to the position under a routing node 6, the routing node 5 notifies an address server 1 of the movement. The address server 1 notifies the routing node 5 of a re-assigned address.

FIG. 8 shows an address notification in the case of the movement of a routing node. Referring to FIG. 8, when a routing node 3 that has a sub-network 17 is moved from the position under a routing node 2 to the position under a routing node 6, the routing node 3 notifies an address server 1 of the movement. The address server 1 notifies the routing node 5 of a re-assigned address. In addition, the address server 1 simultaneously notifies other routing nodes of the re-assigned address of the routing node 3.

Figure 9:
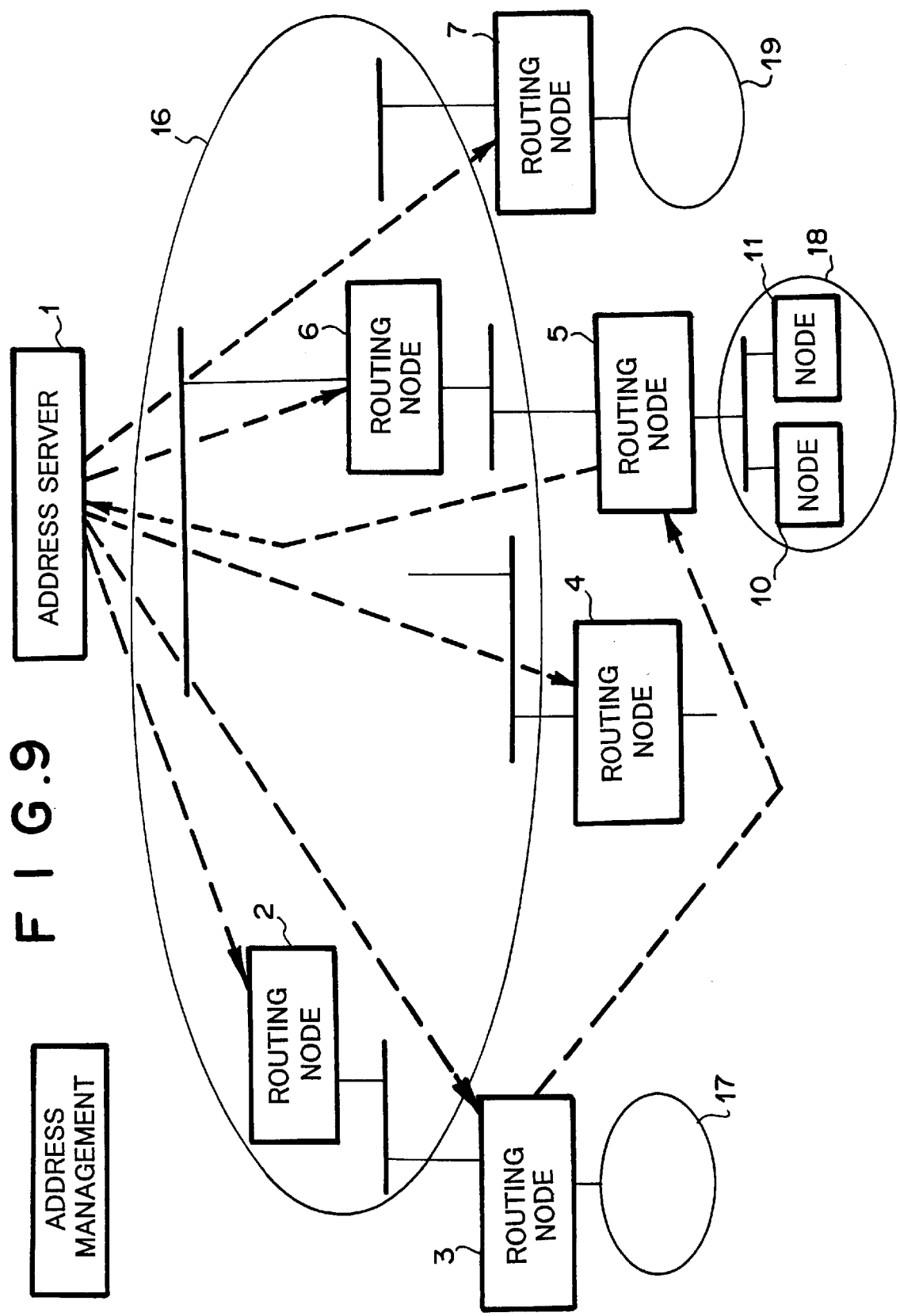
FIG. 9 is a schematic diagram showing the structure of the network according to an embodiment of the present invention.

FIG. 9 shows an address management of a main network 16.

Referring to FIG. 9, whenever a routing node is moved or the address thereof is changed, an address server 1 notifies other routing nodes of the movement or change of the address.

Figure 10:
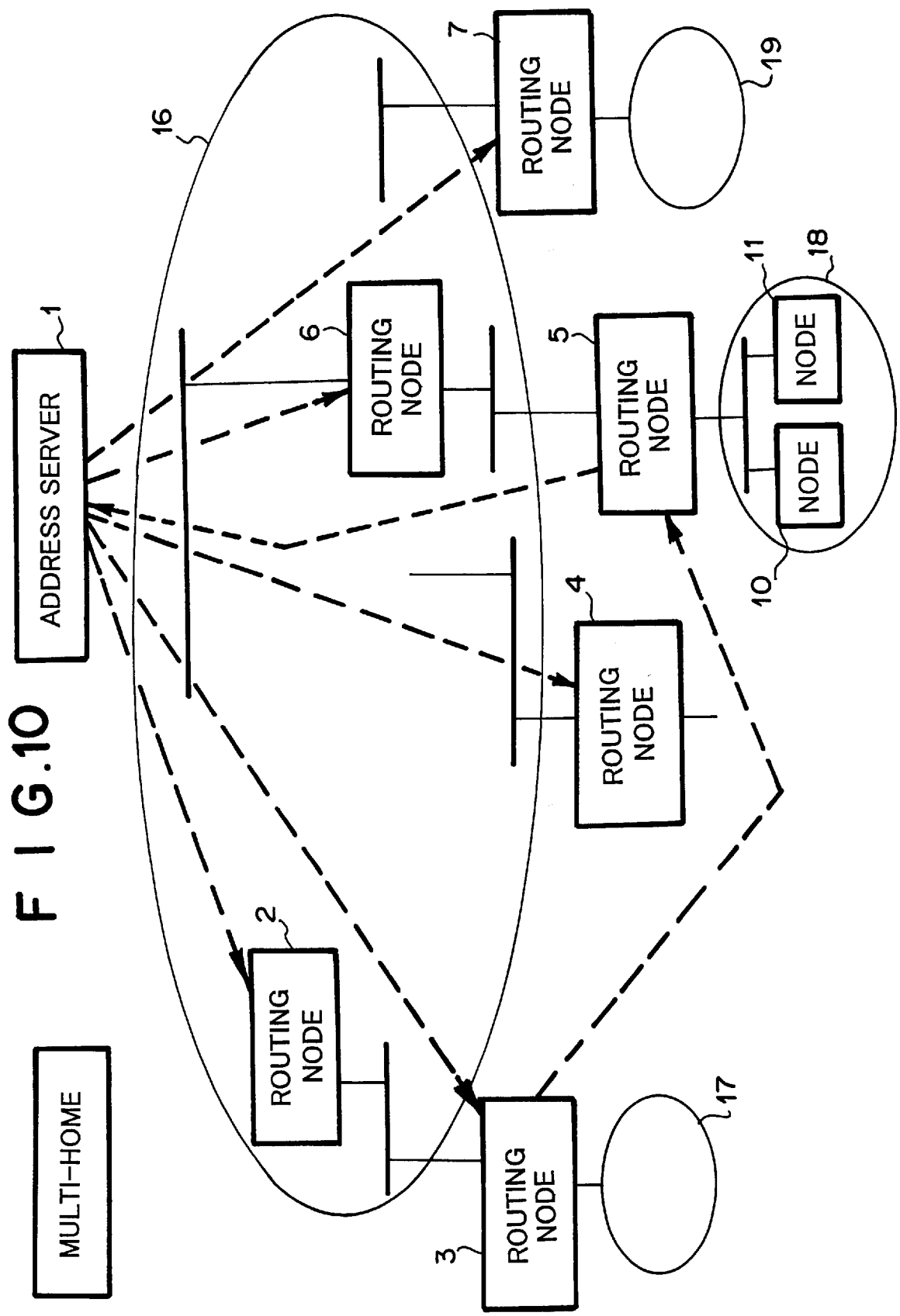
FIG. 10 is a schematic diagram showing the structure of the network according to an embodiment of the present invention.

FIG. 10 shows a multi-home of a simultaneous notification of an address server 1 of a main network 16. Referring to FIG. 10, when a routing node 3 that has a sub-network 17 is moved from the position under a routing node 2 to the position under a routing node 6, the outing node 5 notifies the address server 1 of the movement. The address server 1 simultaneously notifies other routing nodes of the address of the routing node 5 in the multi-home format.

(Operation of First Embodiment)

Next, with reference to FIGS. 2, 3A, 3B, 3C, and 3D, the operation of the system according to the first embodiment of the present invention will be described.

The address server 1 assigns network addresses of the sub-networks 17 to 19 to the routing nodes 2 to 9 (at step S1).

The routing nodes 2 to 9 assign local addresses to the local nodes 10 to 15 of their sub-networks 17 to 19 (at step S2). The routing nodes 2 to 9 have completely assigned local addresses to the local nodes 10 to 15 (at step S2a).

A routing node issues a communication request to transmit data (at step S2b). The routing node determines whether or not there is a destination address (at step S2e). When the determined result at step S2e is No, the routing node inquires of the address server 1 a destination address (at step S3).

When the routing node inquires of the address server 1 the destination address, the address server 1 notifies the routing node of the address of a destination routing node (at step S4).

The routing node performs a transfer process corresponding to the destination address (at step S5). After the routing node has completed the transfer process, the network becomes idle (at step S5a).

When a sub-network has been moved (at step S2c), the relevant routing node notifies the address server 1 of the movement (at step S6).

Thereafter, the address server 1 notifies other routing nodes of the movement of the relevant sub-network (routing node) (at step S7). After the address server 1 has completed the notification process, the network becomes idle (at step S7a).

When a network structure is changed or a network address is re-assigned (at step S2d), the address server 1 notifies a relevant routing node of a re-assignment of the address (at step S8).

Thereafter, the address server 1 notifies other routing nodes of the re-assignment of the address of the relevant routing node (sub-network) (at step S9). After the address server 1 has completed the notification process, the network becomes idle (at step S9a).

Thus, the address server 1 always manages addresses of routing nodes corresponding to the above-described flow chart.

[Second Embodiment]

Next, with reference to the accompanying drawings, a second embodiment of the present invention will be described.

(1) Movement

When a routing node 3 and a sub-network 17 thereof are moved, at the original position and at the destination position, the routing node 3 notifies the address server 1 of the movement (see FIG. 6).

(1.1) Movement (address assignment method)

FIG. 4 shows an address re-assigning method of which the address server 1 assigns a new address to a routing node that has been moved. When a routing node 3 that has a sub-network 17 is moved to the position of a routing node 5 that has a sub-network 19, the address server 1 assigns a new address to the routing node 3. In addition, the address server 1 notifies the routing nodes 2 to 4 of the new address of the routing node 3.

(1.2) Movement (movement notification method)

FIG. 5 shows a movement notification method of which the address server 1 notifies other routing nodes of the movement of a routing node without re-assigning the address of the routing node. When a routing node 3 that has a sub-network 17 notifies the address server 1 of the movement to the position of a routing node 5 that has a sub-network 19, the address server 1 notifies other routing nodes of the movement. In addition, the routing node 3 notifies the local nodes of the movement.

(2) Address management (network)

FIG. 9 shows a change of the network structure due to an increase/decrease of users in a particular region. When the network structure is changed due to an increase or decrease of the number of users in a particular region, as shown in FIG. 9, addresses of routing nodes are re-assigned so as to easily route nodes.

(3) Address management (node)

Each routing node has a firewall function that prevents the security of local host terminals against illegal accesses from the outside of the system (namely, the firewall function is for example NAT (Network Address Translator) that converts an IP address of a company into another address). Thus, in a sub-network of each routing node, addresses can be freely assigned. In this case, the routing node notifies all routing nodes in the main network of the re-assigned addresses.

(4) Multi-home

FIG. 10 shows a multi-home connection structure. In the multi-home connection structure of which a sub-network of a routing node is connected to a higher hierarchical network at several points, by re-assigning addresses, troubles and congestion can be prevented. Conventionally, paths can be changed locally, not globally.

In addition, the load can be shared by dynamically re-assigning addresses corresponding to the results of the traffic supervisory. When a defect takes place in a sub-network, by re-assigning the address thereof, a connection route through such a defective sub-network can be changed.

(Operation of Second Embodiment)

Next, with reference to FIGS. 4 to 10, the operation of the second embodiment of the present invention will be described in detail.

As shown in FIG. 4, the address server 1 assigns physical addresses to the routing nodes 2 to 7. In addition, the address server 1 assigns IP addresses to sub-networks of the routing nodes 2 to 7.

When the network scale and/or structure is changed, the address server 1 re-assigns physical addresses and IP addresses of the routing nodes and the sub-networks.

As shown in FIG. 5, when a node (10 to 12) of the local sub-network of the routing node 3 issues a communication request to the node 13 of the sub-network of the routing node 5, the routing node 3 inquires of the address server 1 the physical address of the routing node 5 that has the destination node 13 (sub-network). The routing node 3 obtains the physical address of the routing node 5 from the address server 1 and transfers data to the physical address of the routing node 5.

As shown in FIG. 6, the routing node 3 and the sub-network 17 thereof are moved from the position under the routing node 2 to the position under the routing node 6. At this point, before the routing node 3 is moved, the routing node 3 notifies the address server 1 of the movement.

As shown in FIG. 7, the address server 1 assigns a new physical address to the routing node 5. At this point, after the routing node 3 has been moved, an IP address node of the sub-network 17 of the routing node 3 notifies the address server 1 of the movement. In this case, the IP address may not be re-assigned.

As shown in FIG. 8, the address server 1 notifies other routing nodes of the movement of the routing node 3. In addition, the address server 1 notifies other routing nodes of the new physical address of the routing node 3. FIG. 9 shows a local address re-assignment as an address management in the case that the routing node 3 is moved to the position of the routing node 5. FIG. 10 shows a multi-home network structure of which the address of the sub-network of the routing node 3 moved to the position of the routing node 5 is managed as one-home movement.

As described above, according to the present invention, the address server assigns physical addresses of routing nodes and addresses of sub-networks. Each routing node assigns an address assigned by the address server to the sub-network. When the sub-network is moved, the routing node notifies the address server of the movement. The address server assigns a physical address of the destination to the moved routing node. The address of the moved sub-network may not be re-assigned. The address server notifies other routing nodes of the address information of the moved routing node.

When a physical address having a geographical and hierarchical structure corresponding to E.164 standard is used for a transfer address of the network, data can be transferred over the network regardless of logical addresses of sub-networks. In other words, with physical addresses having geographical and hierarchical structure corresponding to E.164 standard, the physical position of a destination can be obtained regardless of the address. Thus, addresses can be freely assigned in sub-networks.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A network address assigning system, comprising:

a plurality of sub-networks directly connected to each other;

a network composed of said plurality of sub-networks;

an address server for managing a plurality of network addresses of said sub-networks;

a plurality of nodes for transmitting and receiving messages over said sub-networks;

a plurality of routing nodes each having a node function for transmitting and receiving a message, a router function for transferring a message over said sub-networks, and an address management function for managing the addresses of said sub-networks;

change notification means for causing said address server to re-assign the network addresses of said sub-networks and said routing nodes to notify said address server of the network addresses of said routing nodes;

storage means for causing said address server to store address information; and notification means for causing said address server to communicate with said routing nodes and to notify said routing nodes of newly registered/changed network address information.

2. The network address assigning system as set forth in claim 1, wherein when the network address information is registered by said change notification means, said address server does not notify said routing nodes of the newly changed/registered network address information.

3. The network address assigning system as set forth in claim 1, wherein said routing nodes each have:

means for requesting data from said address server; and means for obtaining a current address information of said network.

4. A network address assigning system as set forth in claim 1, wherein an IP (Internet Protocol) datagram is transferred corresponding to a network address assignment table physically stored by said address server and said sub-networks of said routing nodes.

5. The network address assigning system as set forth in claim 2, wherein said routing nodes each have:

means for requesting data from said address server; and means for obtaining a current address information of said network.

6. A network address assigning system as set forth in claim 2, wherein an IP (Internet Protocol) datagram is transferred corresponding to a network address assignment table physically stored by said address server and said sub-networks of said routing nodes.

7. A network address assigning system as set forth in claim 3, wherein an IP (Internet Protocol) datagram is transferred corresponding to a network address assignment table physically stored by said address server and said sub-networks of said routing nodes.

8. A network address assigning method for use in a network address assigning system having a plurality of sub-networks directly connected to each other, a network composed of said plurality of sub-networks, an address server for managing a plurality of network addresses of said sub-networks, a plurality of nodes for transmitting and receiving messages over said sub-networks, a plurality of routing nodes each having a local node function for transmitting and receiving a message, a router function for transferring a message over said sub-networks, and an address management function for managing the addresses of said sub-networks, the method comprising the steps of:

assigning the network addresses of the said sub-networks to the routing nodes by the address server;

assigning local addresses to the local nodes of the sub-networks by the routing nodes; and completing assignment of the local addresses to the local nodes by the routing nodes.

9. The network address assigning method as set forth in claim 8 further, comprising the steps of:

issuing a communication request to transmit data by the routing node;

determining whether or not the routing node has a destination address;

when it is determined that the routing node does not have the destination address, requesting the destination address from the address server by the routing node;

when the routing node requests the destination address from the address server, notifying the routing node of the address of a destination routing node by the address server; and transmitting the data to the destination address by the routing node, wherein after the routing node has completed transferring the data, the network becomes idle.

* * * * *